(12) United States Patent
Lee et al.

(10) Patent No.: US 7,689,712 B2
(45) Date of Patent: Mar. 30, 2010

(54) TECHNIQUES FOR INTEGRATING NOTE-TAKING AND MULTIMEDIA INFORMATION

(75) Inventors: Dar-Shyang Lee, Union City, CA (US); Berna Erol, Burlingame, CA (US); Jamey Graham, San Jose, CA (US); Peter E. Hart, Menlo Park, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 996 days.

(21) Appl. No.: 10/722,834

(22) Filed: Nov. 26, 2003

(65) Prior Publication Data

US 2005/0114521 A1 May 26, 2005

(51) Int. Cl.
*G06F 15/173* (2006.01)

(52) U.S. Cl. .................. 709/238; 709/202; 709/203; 709/227

(58) Field of Classification Search .................. 709/238, 709/202, 203, 227
See application file for complete search history.

(56) References Cited

U.S. PATENT DOCUMENTS

| 4,578,718 | A | 3/1986 | Parker et al. |
|---|---|---|---|
| 4,686,698 | A | 8/1987 | Tompkins et al. |
| 4,787,063 | A | 11/1988 | Muguet |
| 4,807,186 | A | 2/1989 | Ohnishi et al. |
| 4,881,135 | A | 11/1989 | Heilweil |
| 4,905,094 | A | 2/1990 | Pocock et al. |
| 4,963,995 | A | 10/1990 | Lang |
| 5,091,931 | A | 2/1992 | Milewski |
| 5,164,839 | A | 11/1992 | Lang |
| 5,206,929 | A | 4/1993 | Langford et al. |
| 5,265,205 | A | 11/1993 | Schroder |
| 5,321,396 | A | 6/1994 | Lamming et al. |
| 5,363,425 | A | 11/1994 | Mufti et al. |
| 5,436,792 | A | 7/1995 | Leman et al. |

(Continued)

FOREIGN PATENT DOCUMENTS

JP 403129990 A 6/1991

(Continued)

OTHER PUBLICATIONS

Abowd et al., "Anchoring Discussions in Lecture: An Approach to Collaboratively Extending Classroom Digital Media," http://www.cc.gatech.edu/fce/eclass/pubs/csc199/final.htm.

(Continued)

*Primary Examiner*—Larry Donaghue
*Assistant Examiner*—Nicholas Taylor
(74) *Attorney, Agent, or Firm*—Townsend and Townsend and Crew LLP

(57) ABSTRACT

Techniques to improve a user's note-taking experience. While taking notes for a presentation, a user can request one or more portions of information recorded during the presentation to be inserted into the user's notes document. User interfaces are provided that enable a user to specify which portions of the recorded information are to be inserted into the user's notes document. User information requests that cannot be immediately processed are stored or cached in the notes document for later processing. These cached requests are processed and the requested information inserted into the user's notes document at a later time.

46 Claims, 7 Drawing Sheets

U.S. PATENT DOCUMENTS

| | | | |
|---|---|---|---|
| 5,475,741 A | 12/1995 | Davis et al. |
| 5,485,611 A | 1/1996 | Astle |
| 5,491,511 A | 2/1996 | Odle |
| 5,502,774 A | 3/1996 | Bellegarda et al. |
| 5,526,037 A | 6/1996 | Cortjens et al. |
| 5,530,235 A | 6/1996 | Stefik et al. |
| 5,535,063 A | 7/1996 | Lamming |
| 5,537,141 A | 7/1996 | Harper et al. |
| 5,539,665 A | 7/1996 | Lamming et al. |
| 5,568,406 A | 10/1996 | Gerber |
| 5,596,581 A | 1/1997 | Saeijs et al. |
| 5,610,841 A | 3/1997 | Tanaka et al. |
| 5,633,723 A | 5/1997 | Sugiyama et al. |
| 5,635,982 A | 6/1997 | Zhang et al. |
| 5,673,016 A | 9/1997 | Lutes |
| 5,686,957 A | 11/1997 | Baker |
| 5,706,290 A | 1/1998 | Shaw et al. |
| 5,717,869 A | 2/1998 | Moran et al. |
| 5,717,879 A | 2/1998 | Moran et al. |
| 5,721,878 A | 2/1998 | Ottesen et al. |
| 5,729,741 A | 3/1998 | Liaguno et al. |
| 5,729,931 A | 3/1998 | Wade |
| 5,734,719 A | 3/1998 | Tsevdos et al. |
| 5,751,281 A | 5/1998 | Hoddie et al. |
| 5,760,767 A | 6/1998 | Shore et al. |
| 5,764,789 A | 6/1998 | Pare, Jr. et al. |
| 5,767,897 A | 6/1998 | Howell |
| 5,793,365 A | 8/1998 | Tang et al. |
| 5,799,150 A | 8/1998 | Hamilton et al. |
| 5,802,294 A | 9/1998 | Ludwig et al. |
| 5,845,261 A | 12/1998 | McAbian |
| 5,854,831 A | 12/1998 | Parsadayan et al. |
| 5,862,292 A | 1/1999 | Kubota et al. |
| 5,924,099 A | 7/1999 | Guzak et al. |
| 5,929,848 A | 7/1999 | Albukerk et al. |
| 5,946,654 A | 8/1999 | Newman et al. |
| 5,956,026 A | 9/1999 | Ratakonda |
| 5,978,477 A | 11/1999 | Hull et al. |
| 5,986,655 A | 11/1999 | Chiu et al. |
| 5,987,454 A | 11/1999 | Hobbs |
| 5,990,934 A | 11/1999 | Nalwa |
| 5,991,429 A | 11/1999 | Coffin et al. |
| 5,999,173 A | 12/1999 | Ubillos |
| 6,008,807 A | 12/1999 | Bretschneider et al. |
| 6,020,883 A | 2/2000 | Herz et al. |
| 6,041,360 A | 3/2000 | Himmel et al. |
| 6,055,566 A | 4/2000 | Kikinis |
| 6,084,582 A | 7/2000 | Qureshi et al. |
| 6,115,718 A | 9/2000 | Huberman et al. |
| 6,154,601 A | 11/2000 | Yaegashi et al. |
| 6,154,771 A | 11/2000 | Rangan et al. |
| 6,177,939 B1 | 1/2001 | Blish et al. |
| 6,189,783 B1 | 2/2001 | Motomiya et al. |
| 6,193,658 B1 | 2/2001 | Wendelken et al. |
| 6,209,000 B1 | 3/2001 | Klein et al. |
| 6,249,281 B1 | 6/2001 | Chen et al. |
| 6,332,147 B1 | 12/2001 | Moran et al. |
| 6,334,109 B1 | 12/2001 | Kanevsky et al. |
| 6,349,297 B1 | 2/2002 | Shaw et al. |
| 6,369,835 B1 | 4/2002 | Lin |
| 6,392,694 B1 | 5/2002 | Bianchi |
| 6,393,462 B1 | 5/2002 | Mullen-Schultz |
| 6,396,500 B1 | 5/2002 | Qureshi et al. |
| 6,405,203 B1 | 6/2002 | Collart |
| 6,418,421 B1 | 7/2002 | Hurtado et al. |
| 6,421,009 B2 | 7/2002 | Suprunov |
| 6,449,653 B2 | 9/2002 | Klemets et al. |
| 6,452,615 B1* | 9/2002 | Chiu et al. ............. 715/776 |
| 6,469,711 B2 | 10/2002 | Foreman et al. |
| 6,490,601 B1 | 12/2002 | Markus et al. |
| 6,510,553 B1 | 1/2003 | Hazra |
| 6,526,426 B1 | 2/2003 | Lakritz |
| 6,529,920 B1 | 3/2003 | Arons et al. |
| 6,535,639 B1 | 3/2003 | Uchihachi et al. |
| 6,571,295 B1 | 5/2003 | Sidana |
| 6,646,655 B1 | 11/2003 | Brandt et al. |
| 6,665,490 B2 | 12/2003 | Copperman et al. |
| 6,721,288 B1* | 4/2004 | King et al. ............. 370/310 |
| 6,728,753 B1 | 4/2004 | Parasnis et al. |
| 6,750,978 B1 | 6/2004 | Marggraff et al. |
| 6,766,363 B1 | 7/2004 | Rothschild |
| 6,779,024 B2 | 8/2004 | DeLaHuerga |
| 6,782,049 B1 | 8/2004 | Dufaux et al. |
| 6,789,228 B1 | 9/2004 | Merril et al. |
| 6,810,146 B2 | 10/2004 | Loui et al. |
| 6,816,858 B1 | 11/2004 | Coden et al. |
| 6,976,032 B1 | 12/2005 | Hull et al. |
| 7,020,721 B1 | 3/2006 | Levenberg |
| 7,131,058 B1 | 10/2006 | Lapstun et al. |
| 7,167,191 B2 | 1/2007 | Hull et al. |
| 7,174,289 B2 | 2/2007 | Sukehiro |
| 7,184,100 B1 | 2/2007 | Wilf et al. |
| 7,215,436 B2 | 5/2007 | Hull et al. |
| 7,299,405 B1 | 11/2007 | Lee et al. |
| 7,343,617 B1 | 3/2008 | Katcher et al. |
| 7,478,125 B2 | 1/2009 | Chang |
| 7,508,419 B2 | 3/2009 | Toyama et al. |
| 7,554,576 B2 | 6/2009 | Erol et al. |
| 2001/0037408 A1 | 11/2001 | Thrift et al. |
| 2001/0054019 A1 | 12/2001 | De Fabrega |
| 2002/0010641 A1 | 1/2002 | Stevens et al. |
| 2002/0048224 A1 | 4/2002 | Dygert et al. |
| 2002/0056082 A1 | 5/2002 | Hull et al. |
| 2002/0097885 A1 | 7/2002 | Birchfield et al. |
| 2002/0163548 A1 | 11/2002 | Chiu et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2003/0007776 A1 | 1/2003 | Kameyama et al. |
| 2003/0022098 A1 | 1/2003 | Koes |
| 2003/0117652 A1 | 6/2003 | Lapstun |
| 2003/0234772 A1* | 12/2003 | Zhang et al. ............. 345/177 |
| 2003/0236777 A1* | 12/2003 | Conway ............. 707/3 |
| 2004/0054964 A1 | 3/2004 | Bozdagi et al. |
| 2004/0078805 A1 | 4/2004 | Brian et al. |
| 2004/0105004 A1 | 6/2004 | Rui et al. |
| 2004/0143602 A1 | 7/2004 | Ruiz et al. |
| 2004/0143630 A1* | 7/2004 | Kaufmann et al. ............. 709/205 |
| 2004/0201685 A1 | 10/2004 | Seaman et al. |
| 2004/0205555 A1* | 10/2004 | Hind et al. ............. 715/513 |
| 2004/0244039 A1 | 12/2004 | Sugahara et al. |
| 2004/0249650 A1 | 12/2004 | Freedman et al. |
| 2004/0263636 A1* | 12/2004 | Cutler et al. ............. 348/211.12 |
| 2005/0064935 A1 | 3/2005 | Blanco |
| 2006/0005136 A1 | 1/2006 | Wallick et al. |
| 2006/0010095 A1 | 1/2006 | Wolff et al. |
| 2006/0041542 A1 | 2/2006 | Hull et al. |
| 2006/0041632 A1 | 2/2006 | Shah et al. |
| 2006/0129576 A1 | 6/2006 | Carpentier et al. |
| 2006/0284981 A1 | 12/2006 | Erol et al. |
| 2006/0288273 A1 | 12/2006 | Erol et al. |
| 2007/0033419 A1 | 2/2007 | Kocher et al. |
| 2007/0038935 A1 | 2/2007 | Hull et al. |

FOREIGN PATENT DOCUMENTS

| | | |
|---|---|---|
| JP | 07-234694 A | 9/1995 |
| JP | 08-125737 A | 5/1996 |
| JP | 10-246041 A | 9/1998 |
| JP | 2007-004784 A | 1/2007 |
| KR | 2003-0097669 A | 12/2003 |
| KR | 10-2006-0133469 A | 12/2006 |
| WO | WO 02/13522 A2 | 2/2002 |

WO    WO 02/058432 A2    7/2002

OTHER PUBLICATIONS

Abowd et al., "Teaching and Learning as Multimedia Authoring: The Classroom 2000 Project," *ACM Multimedia '96*, Boston, MA, 1996.
Abowd et al., "Building a Digital Library of Captured Educational Experiences," Invited paper for the 2000 International Conference on Digital Libraries, Kyoto, Japan, Nov. 13-16, 2000.
Abowd et al., "Classroom 2000: A System for Capturing and Accessing Ultimedia Classroom Experiences," http://www.cc.gatech.edu/fce/eclass/pubs/chi98/short/index.html.
Brotherton et al., "Automated Capture, Integration, and Visualization of Multiple Media Streams," *Proceedings of IEEE Multimedia '98*, 1998.
Brotherton, J. A., "Enriching Everyday Activities Through the Automated Capture and Access of Live Experiences—eClass: Building, Observing, and Understanding the Impact of Capture and Access in an Educational Domain," Ph.D. Thesis Georgia institute of Technology, Sep. 2001, 284 pages.
Chiu et al., "NoteLook: Taking Notes in Meetings with Digital Video and Ink," *Proceedings of ACM Multimedia '99*, pp. 149-158, Orlando, Flordia, Nov. 1999.
Chiu et al., "LiteMinutes: An Internet-Based System for Multimedia Meeting Minutes," *Proc. 10th World Wide Web Conf.*, May 2, 2001, downloaded from http://citeseer.ist.psu.edu/chiu01 liteminutes.html on Feb. 5, 2004.
Cruz et al., "Capturing and Playing Multimedia Events with Streams," *ACM Multimedia '94*, San Francisco, CA, 1994.
Davis et al., "A Framework for Sharing Handwritten Notes," *Proceedings of UIST '98*, pp. 119-120, Nov. 1998.
Lamming, M. G., "NoTime—A Tool for Notetakers," Feb. 22, 1991, http://www.xrce.xerox.com/programs/mds/past-projects/notime-report.html.
Lee et al., "MinuteAid: Multimedia Note-Taking in an Intelligent Meeting Room," *IEEE Int. Conf. Multimedia and Expo (ICME)*, Taipei, Taiwan, Jun. 27, 2004.
Minneman et al., "Where Were We: Making and Using Near-synchronous, Pre-narrative Video," *ACM Multimedia*, 1993.
Menneman et al., "A Confederation of Tools for Capturing and Accessing Collaborative Activity" *ACM Multimedia '95*, San Francisco, CA 1995.
Moran et al., "Tivoli: Integrating Structured domain Objects into a Freeform Whiteboard Environment," *Proceedings of International Conference on Human Factors in Computer Systems (CHI)*, pp. 20-21, Apr. 1-6, 2000.
Pedersen et al., "Tivoli: An Electronic Whiteboard for Informal Workgroup Meetings," *Proceedings of International Conference on Human Factors in Computer Systems (CHI '93)*, ACM, New York.
Pimental et al., "Linking by Interacting: a Paradigm for Authoring Hypertext," *Proceedings of ACM Hypertext '2000*, San Antonio, TX, May 2000.
Price et al., "linking by Inking: Trailblazing in a Paper-like Hypertext," *ACM Hypertest '98*, pp. 30-39, Pittsburg, PA Jun. 20-24, 1998.
Stifelman, L., "The Audio Notebook: Paper and Pen Interaction with Structured Speech," PhD Thesis, MIT 1997.
Truong et al., "Personalizing the Capture of Public Experiences," *Proceedings of UIST '99*, Nov. 1999.
Truong et al., "Architectural Support for Building Automated Capture & Access Applications," *Online!*, Oct. 20, 2003, downloaded from http://web.archive.org/web/20031020022039/http://www.cc.gatech.edu/classes/AY2004/cs4470_fall/readings/inca-icse03 on Feb. 4, 2005.
Weber et al., "Marquee: A Tool for Real-Time Video Logging," *CHI '94*, Boston, MA 1994.
Whittaker et al., "Filochat: handwritten notes provide access to recorded conversations " *Proceedings of CHI '94*, ACM Press, pp. 271-276 (1994).
Wilcox et al., "Dynomite: A Dynamically Organized Ink and Audio Notebook," *CHI '97 Conference Proceedings*, ACM Press, pp. 186-193 (1997).

Communication of Mar. 2, 2007 from European Patent Office regarding European application 04 024 390.9-1527.
Communication of Jan. 12, 2006 from European Patent Office regarding European application 04 024 390.9-1527.
Addlesee et al., "The ORL Active Floor," IEEE Personal Communications, Oct. 1997, pp. 35-41, vol. 4, No. 5, IEEE.
Adobe Premiere Real-Time editing for HD, SD, and DV, pp. 1-2, Adobe, printed on Jan. 18, 2007at URL: http://www.adobe.com/products/premiere/index.html.
Chen et al., "Real-time Speaker Tracking Using Particle Filter Sensor Fusion," *Proc. IEEE*, Mar. 2004, 13 pages, vol. 92, Issue 3.
European Communication for European Application No. 04255836.1, mailed Jun. 11, 2007, 10 pages.
Cunado et al., "Gait Extraction and Description by Evidencing Gathering," Proceedings of the Second International Conference on Audio and Video-based Person Identification, Washington, D.C., Mar. 22-23, 1999, pp. 43-48.
Cutler et al., "Distributed Meetings: A Meeting Capture and Broadcasting System," ACM Multimedia 2000, 10 pages, AMC.
Denoue et al., "ProjectorBox; Seamless Presentation Capture for Classrooms," World Conference on E-Learning in Corporate, Government, Healthcare, & Higher Education (E-Learn 2005), Oct. 24, 2005, 6 pages.
DVD EZmaker USB 2.0, AVerMedia Digital Multimedia, 1 page, printed on Jan. 18, 2007 at URL: http://www.aver.com/2005home/product/videocapture/ezmakerusb2.0/ezmakerusb2.0.shtml.
Eldridge et al., "Does a Video Diary Help Recall? Technical Report EPC-1991-124," People and Computers VII, eds. Monk et al., 1992, 1992, pp. 257-269, Ramk Xerox Ltd., Cambridge.
Erol et al., "Multimodal Summarization of Meeting Recordings," ICME, 2003, 24 pages.
Foote et al. "An Intelligent Media Browser Using Automatic Multimodal Analysis," ACM Multimedia, 1998, pp. 375-380, AMC, Bristol UK.
Girgensohn et al., "Time-Constrained Keyframe Selection Technique," Multimedia Tools and Applications, 2000, pp. 347-358, vol. 11, issue 3.
Gross et al., "Towards a Multimodal Meeting Record," ICME, 2000, pp. 1593-1596, New York.
Hilbert et al., "Seamless Capture and Discovery for Corporate Memory," The 15th International World Wide Web Conference (WWW2006), Edinburgh, UK, May 22-26, 2006, 10 pages.
Hilbert et al., "Seamless Presentation Capture, Indexing, and Management," Internet Multimedia Management Systems VI (SPIE Optics East 2005), Oct. 26, 2005, 9 pages.
Hu et al., "Audio Hot Spotting and Retrieval Using Multiple Audio Features and Multiple ASR Engines," HLT-NAACL 2004 Workshop on Interdisciplinary Approaches to Speech Indexing and Retrieval, 2004, 6 pages.
ICSI Meeting Recorder Project: Recording software, pp. 1-3, printed on Jan. 18, 2007, at URL: http://www.icsi.berkeley.edu/~dpwe/research/mtgrcdr/rcd-sw.html.
Jaimes et al., "Memory Cues for Meeting Video Retrieval," ACM CARPE Workshop 2004, Oct. 15, 2004, pp. 74-85, ACM, New York, NY.
Konneker, "Automating Receptionists," Proceedings of the 1986 IEEE International Conference on Systems, Man, and Cybernetics, Atlanta, GA, Oct. 14-17, 1986, pp. 1592-1596, IEEE.
Lamming et al., "Activity-based Information Retrieval: Technology in Support of Personal Memory," F.H. Vogt (ed.), Personal Computers and Intelligent Systems. Proceedings of Information Processing 92, 1992, pp. 68-81, vol. 3, Elsevier Science Publishers, North Holland.
Lee et al., "Portable Meeting Recorder," ACM Multimedia 2002, Dec. 1-6, 2002 pp. 493-502, ACM, Juan Les Pins, France.
Lovstrand, "Being Selectively Aware with the Khronika System," Proceedings of the Second European Conference on Computer-Supported Cooperative Work, Sep. 25-27, 1991, pp. 265-277, Amsterdam, The Netherlands, Sep. 25-27, 1991, pp. 265-277, Rank Xerox EuroPARC, United Kingdom.
Meet?ng Room, An Interactive Systems Labs Project, p. 1, printed on Jan. 18, 2007 at URL: http://www.is.cs.cmu.edu/meeting_room/browser/browser_toprint.html.

Nair, "Calculation of an Aggregated Level of Interest Function for Recorded Events," ACM Multimedia 2004, Oct. 10-16, 2004, 4 pages, ACM New York, NY.

Newman et al., "PEPSYS: Generating Autobiographies by Automatic Tracking," Proceedings of the Second European Conference on Computer-Supported Cooperative Work, Sep. 25-27, 1991, Amsterdam, The Netherlands, Sep. 25-27, 1991, pp. 175-188, Rank Xerox EuroPARC, England.

Nishimura et al., "Indexing of human motion at meeting room by analyzing time-varying images of omni-directional camera," Conference on Computer Vision, 2000, pp. 1-4, vol. 1.

Nuance—ScanSoft Imaging Solutions, 1 page, printed on Jan. 18, 2007, at URL: http://www.nuance.com/scansoft/.

Plamondon et al., "Automatic Signature Verification and Writer Identification—The State of the Art," Pattern Recognition, Pattern Recognition, Aug. 10, 1998, pp. 107-131, vol. 22, No. 2, Great Britian.

Product Description for Meeting Companion by Quindi Corporation, 2004, 8 pages, printed on Jan. 24, 2005, at URL: http://quindi.com/product.htm.

Rangan, "Software Implementation of VCRs on Personal Computing Systems," IEEE Transactions on Consumer Electronics, Aug. 1992, pp. 635-640, vol. 38, No. 3, IEEE.

Rangan et al., "A Window-Based Editor for Digital Video and Audio," IEEE 1992, pp. 640-648, IEEE.

Rosenschein, "New Techniques for Knowledge Capture," TTI/Vanguard Conference: Knowledge Management Comes of Age, Sep. 23-24, 2003 Washington D.C., Sep. 23-24, 2003, pp. 1-3, TTI/Vanguard.

Rui et al., "Automating lecture capture and broadcast: technology and videography," ACM Multimedia Systems Journal, 2004, pp. 1-13, vol. 10, Multimedia Systems.

"Smart Lobby: The Electronic Sign-In Book That Tracks Visitors and Prints Badges, User Guide for Windows," Seiko Instruments, Inc., 1997, 43 pages, Seiko Instruments USA, Inc., San Jose CA.

Song et al., "PVCAIS: A Personal Videoconference Archive Indexing System," ICME 2003, pp. 673-676, IEEE.

"Sony EVI-D100 Pan/Tilt/Zoom Color Video Camera," Picture Phone Direct, pp. 1-2, printed on Jan. 18, 2007, at URL: http://www.picturephone.com/products/sony_evid 100.htm.

Sony Music Corporation, "E-Guide Unmanned Reception System," Japan Industrial Journal, May 20, 1996, p. 6.

Stifelman et al., "The Audio Notebook," CHI 2001, Mar. 31-Apr. 5, 2001, 150 pages, vol. 3, No. 1, Seattle, WA.

Systran® Language Translation Technologies, p. 1, printed on Jan. 18, 2007, at URL: http://www.syttransoft.com/index.html.

Uchihashi et al., "Video Magna: Generating Semantically Meaningful Video Summaries," Proc. Multimedia 1999, 10 pages.

Viredaz M.A., "The Itsy Pocket Computer Version 1.5: User's Manual," Technical Note TN-54, Compaq Western Research Laboratory, Jul. 1998, pp. 1-37, Digital Western Research Laboratory, Palo Alto, CA.

Want et al., "The Active Badge Location System," ACM Transactions on Information Systems, Jan. 1992, pp. 91-102, vol. 10, No. 1.

WebEx: Web Conferencing, Online Meetings, and Video Conferencing , 1 page, printed on Jan. 18, 2007, at URL: http://www.webex.com.

Non-Final Office Action for U.S. Appl. No. 09/714,785, mailed Apr. 9, 2003, 27 pages.

Final Office Action for U.S. Appl. No. 09/714,785, mailed Sep. 17, 2003, 25 pages.

Advisory Action for U.S. Appl. No. 09/714,785, mailed Nov. 26, 2003, 3 pages.

Non-Final Office Action for U.S. Appl. No. 09/714,785, mailed Mar. 5, 2004, 25 pages.

Final Office Action for U.S. Appl. No. 09/714,785, mailed Dec. 7, 2004, 33 pages.

Final Office Action for U.S. Appl. No. 09/714,785, mailed Jul. 12, 2005, 8 pages.

Notice of Allowance for U.S. Appl. No. 09/714,785, mailed Nov. 1, 2005, 4 pages.

Non-Final Office Action for U.S. Appl. No. 11/250,780, mailed Jul. 27, 2007, 13 pages.

Final Office Action for U.S. Appl. No. 11/250,780, mailed May 30, 2008, 31 pages.

Non-Final Office Action for U.S. Appl. No. 09/728,560, mailed May 23, 2003.

Interview Summary for U.S. Appl. No. 09/728,560, mailed Oct. 30, 2003.

Notice of Allowance for U.S. Appl. No. 09/728,560, mailed Nov. 4, 2003.

Interview Summary for U.S. Appl. No. 09/728,560, mailed Jan. 21, 2004.

Notice of Allowance for U.S. Appl. No. 09/728,560, mailed Nov. 22, 2004.

Notice of Allowance for U.S. Appl. No. 09/728,560, mailed Dec. 16, 2005.

Non-Final Office Action for U.S. Appl. No. 11/389,513, mailed Jun. 25, 2008, 15 pages.

Final Office Action for U.S. Appl. No. 11/389,513, mailed Mar. 3, 2009, 23 pages.

Non-Final Office Action for U.S. Appl. No. 09/728,453, mailed Dec. 1, 2004, 27 pages.

Final Office Action for U.S. Appl. No. 09/728,453, mailed Sep. 21, 2005, 14 pages.

Advisory Action for U.S. Appl. No. 09/728,453, mailed Feb. 22, 2006, 4 pages.

Non-Final Office Action for U.S. Appl. No. 09/728,453, mailed Aug. 27, 2007, 12 pages.

Final Office Action for U.S. Appl. No. 09/728,453, mailed Apr. 15, 2008, 17 pages.

Non-Final Office Action for U.S. Appl. No. 09/728,453, mailed Dec. 23, 2008, 17 pages.

Non-Final Office Action for U.S. Appl. No. 09/521,252, mailed Jan. 20, 2004, 13 pages.

Non-Final Office Action for U.S. Appl. No. 09/521,252, mailed Oct. 21, 2004, 17 pages.

Interview Summary for U.S. Appl. No. 09/521,252, mailed Nov. 23, 2004, 3 pages.

Final Office Action for U.S. Appl. No. 09/521,252, mailed Jun. 2, 2005, 16 pages.

Advisory Action for U.S. Appl. No. 09/521,252, mailed Oct. 12, 2005, 4 pages.

Non-Final Office Action for U.S. Appl. No. 09/521,252, mailed Jan. 6, 2006, 16 pages.

Final Office Action for U.S. Appl. No. 09/521,252, mailed Oct. 5, 2006, 14 pages.

Interview Summary for U.S. Appl. No. 09/521,252, mailed Mar. 16, 2007, 3 pages.

Interview Summary for U.S. Appl. No. 09/521,252, mailed Jul. 17, 2007, 1 pages.

Notice of Allowance for U.S. Appl. No. 09/521,252, mailed Jul. 17, 2007, 10 pages.

Non-Final Office Action for U.S. Appl. No. 11/158,315, mailed Jul. 30, 2008, 32 pages.

Final Office Action for U.S. Appl. No. 11/158,315, mailed Jan. 26, 2009, 30 pages.

Interview Summary for U.S. Appl. No. 11/158,315, mailed Feb. 17, 2009, 2 pages.

Advisory Action for U.S. Appl. No. 11/158,315, mailed Apr. 15, 2009, 4 pages.

Non-Final Office Action for U.S. Appl. No. 11/158,315, mailed Jul. 9, 2009, 27 pages.

Non-Final Office Action for U.S. Appl. No. 11/158,313, mailed Nov. 14, 2008, 33 pages.

Notice of Allowance for U.S. Appl. No. 11/158,313, mailed Apr. 9, 2009, 14 pages.

U.S. Appl. No. 12/408,583, filed Mar. 20, 2009, Savitzky et al.

Bilgen et al., "inSpace Projector: An Accessible Display System for Meeting Environments," 2 pages, at URL: http://www.cc.gatech.edu/pixi/pubs/ubicomp06-inspace-proj.pdf.

Elrod et al., "Liveboard: A Large Interactive Display Supporting Group Meetings, Presentations and Remote Collaboration," CHI '92, May 3-7, 1992, pp. 599-607, AMC.

"Interact, Annotate, Engage—Interwrite Pad," Brochure, 2 pages, Interwrite Learning.

"No Need for Wires! Micronet SP925 Wireless Projector Server Brings Presentation Freedom and Efficiency without Compromising Security," Partner eNews, Nov. 9, 2007, 2 pages, Micronet Communications Inc.

Schneier et al., "Cryptographic Support for Secure Logs on Untrusted Machines," Proceedings of the 7th USENIX Security Symposium, Jan. 26-29, 1998, 11 pages, USENIX, San Antonio, TX.

Smart SB685ix, Product Information, 1 page, SmartBoards.com.

Notice of Allowance for U.S. Appl. No. 11/389,513, mailed on Sep. 1, 2009, 27 pages.

Notice of Allowance for U.S. Appl. No. 09/728,453, mailed on Sep. 18, 2009, 16 pages.

Requirement for Restriction/Election for U.S. Appl. No. 10/887,998, mailed on Mar. 30, 2007, 10 pages.

Non-Final Office Action for U.S. Appl. No. 10/887,998, mailed on Jul. 12, 2007, 8 pages.

Final Office Action for U.S. Appl. No. 10/887,998, mailed on Jan. 8, 2008, 8 pages.

Non-Final Office Action for U.S. Appl. No. 10/887,998, mailed on Jul. 28, 2008, 8 pages.

Final Office Action for U.S. Appl. No. 10/887,998, mailed on Dec. 22, 2008, 9 pages.

Advisory Action for U.S. Appl. No. 10/887,998, mailed on Mar. 6, 2009, 3 pages.

Non-Final Office Action for U.S. Appl. No. 10/887,998, mailed on May 11, 2009, 12 pages.

* cited by examiner

TECHNIQUES FOR INTEGRATING NOTE-TAKING AND MULTIMEDIA INFORMATION

COPYRIGHT

A portion of the disclosure of this patent document contains material that is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

CROSS-REFERENCES TO RELATED APPLICATIONS

The entire contents of the following applications are incorporated herein by reference for all purposes:

(1) U.S. application Ser. No. 09/728,560, filed Nov. 30, 2000, which issued as U.S. Pat. No. 7,167,191;

(2) U.S. application Ser. No. 09/728,453, filed Nov. 30, 2000; and (3) U.S. application Ser. No. 09/521,252, filed Mar. 8, 2000, which issued as U.S. Pat. No. 7,299,405.

BACKGROUND OF THE INVENTION

The present invention relates to a note-taking system, and more particularly to techniques that improve a user's note-taking experience in an environment where information of various types is being recorded.

Several techniques have been developed in the past few years for capturing information during a meeting, lecture, or other like presentation. For example, during a presentation, slides (e.g., from a PowerPoint presentation) and video clips may be shown on a projection device while the presenter discusses information related to the slides and/or video clips. Attendees of the meeting may also join in the discussion. The presenter may also write on a whiteboard during the presentation. In such an environment, one or more information capture devices may be provided to record the multimedia information output during the presentation. For example, a video camera may be used to record the slides/video clips presented on the projection device or the actual scene of the presentation. Audio devices such as microphones may be used to capture the audio information spoken by the presenter or the attendees of the meeting. A whiteboard capture device may be used to capture information written on the whiteboard. Various other types of devices may be used to record other types of information output during the presentation.

The recorded information captured by the various capture devices is usually stored and can be accessed or consumed by a user after the presentation. For example, a user who could not attend the meeting can access the recorded information and play back the information after the meeting. In this manner, the archived information is available for use subsequent to the meeting.

During a presentation, attendees of the presentation usually capture information presented during the presentation by taking notes. Although the traditional technique of taking notes has been to use a paper and pencil/pen, an increasing number of users now use computing devices such as laptops, personal digital assistants (PDAs), tablet PCs, etc. to take notes during presentations. However, even with these devices, it is usually quite difficult for the note-taker to capture in his/her notes information of various types (e.g., audio information, slides, video information, etc.) that is output during the presentation. Although, the information during the presentation is being recorded, the recorded information is not available for use by the note-taker until after the presentation has completed. Accordingly, the recorded information cannot be used by the note-taker while the presentation is in progress.

Accordingly, there is a need for techniques that improve a user's note-taking experience.

BRIEF SUMMARY OF THE INVENTION

Embodiments of the present invention improve a user's note-taking experience. While taking notes for a presentation, a user can request one or more portions of information recorded during the presentation to be inserted into the user's notes document. User information requests that cannot be immediately processed are stored or cached in the notes document for later processing. These cached requests are processed and the requested information inserted into the user's notes document at a later time.

According to an embodiment of the present invention, techniques are provided for taking notes in an environment comprising a server configured to respond to requests requesting a portion of stored information, the stored information comprising first information captured by one or more capture devices during a first presentation, and a note-taking device for taking notes during the first presentation in a notes document. A first request is received at the note-taking device during the first presentation to insert a first portion of the first information in a first location in the notes document. A determination is made if the first request can be processed. The first request is stored in the notes document upon determining that the first request cannot be processed.

According to an embodiment of the present invention, a determination is made, subsequent to storing the first request in the notes document, if the note-taking device can communicate with the server. The first request is processed upon determining that the note-taking device can communicate with the server. According to an embodiment, the first portion of the first information is inserted in the notes document in the first location.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
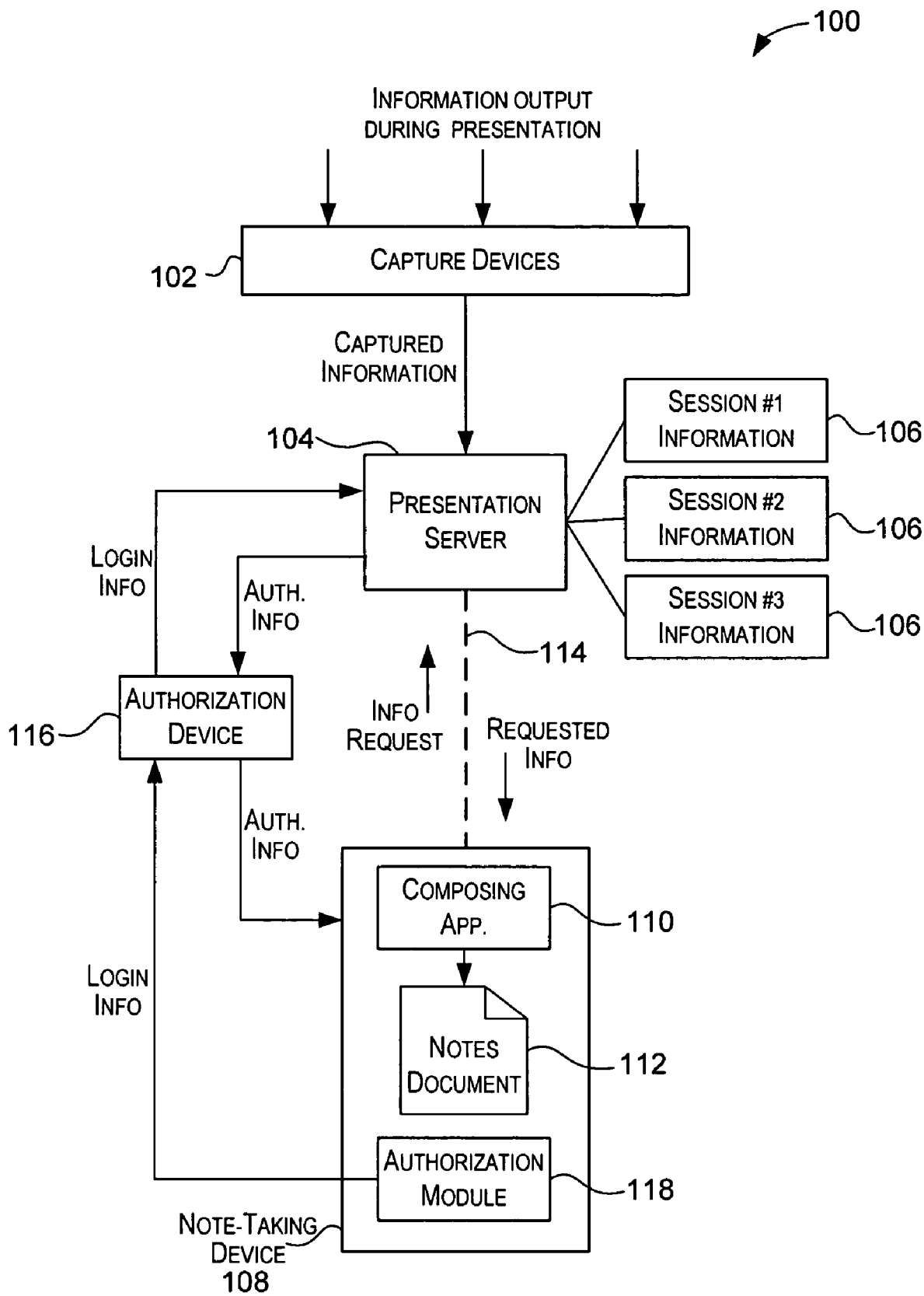
FIG. 1 is a simplified block diagram of a system that may incorporate an embodiment of the present invention.

FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, system 100 includes one or more information capture devices 102 that are configured to capture (or record) information during a presentation. For purposes of this application, a "presentation" is intended to refer to any event or period of time during which information is presented or output. Examples of presentations include meetings, lectures, discussions, classes, conferences, speeches, demonstrations, playback of previously recorded information, and the like. A presentation need not be contiguous in time and can be spread out over non-contiguous time periods. For example, a presentation may be spread out over several days and may be interspersed by other events.

For purposes of this application, an "information capture device" is intended to refer to any device, system, or apparatus that is configured to capture or record information of one or more types. Various different types or streams of information such as audio information, video information, slides or images, whiteboard information, text information (e.g., user contributed comments), etc. may be output during a presentation and captured by information capture devices 102. Examples of information capture devices 102 include microphones, video cameras, analog or digital photo cameras, scanners, screen capture devices (e.g., a device configured to capture information printed on a whiteboard), presentation recorders, etc. Information capture devices 102 may also be configured to capture temporal information when the information is captured.

A presentation recorder is a device that is able to capture information presented during a presentation, for example, by tapping into and capturing streams of information from an information source such as a computer executing a PowerPoint application and displaying slides from a *.ppt file. A presentation recorder may be configured to tap into the video output of the computer and capture keyframes every time a significant difference is detected between displayed video keyframes of the slides. The presentation recorder may also be configured to capture other types of information such as audio information, video information, slides information stream, etc. Time stamps indicating time of capture may also be stored by the presentation recorder. The temporal information indicating when the information was output or captured may be used to synchronize the different types of captured information streams. Examples of presentation recorders include a screen capture software application that allows recording of slides and time elapsed for each slide during a presentation. Examples of presentation recorders are described in U.S. application Ser. No. 09/728,560, filed Nov. 30, 2000 which issued as U.S. Pat. No. 7,167,191, U.S. application Ser. No. 09/728,453, filed Nov. 30, 2000, and U.S. application Ser. No. 09/521,252, filed Mar. 8, 2000, which issued as U.S. Pat. No. 7,299,405, whose contents are incorporated herein by reference for all purposes.

In the embodiment depicted in FIG. 1, the information recorded by information capture devices 102 is pushed to server 104 ("presentation server 104") that caches and maintains the recorded information. The information may be pushed to presentation server 104 in a continuous stream or in bursts. The recorded information may include streams of information of various types including slides, images, audio segments, (e.g., MP3 audio segments), video clips or segments, whiteboard information segments, text information, etc.

Presentation server 104 may store the information received from information capture devices 102 in a memory location accessible (locally or via a network) to presentation server 104. In one embodiment, presentation server 104 is configured to coordinate access to the stored information. For example, presentation server 104 is configured to respond to requests requesting portions of the recorded information.

According to an embodiment of the present invention, the recorded information may be organized into "sessions" 106. For purposes of this application, a "session" is a collection of recorded information. For example, a session may correspond to information streams captured by information capture devices 102 during a certain time period. For example, information recorded during a first presentation (e.g., a meeting between 1:00 pm and 2:00 pm) may be stored as a first session while information recorded during a second presentation (e.g., a meeting between 3:00 pm and 5:00 pm) may be stored as another session. A session may also store information recorded over different time periods or different presentations. For example, information captured during a series of lectures may be stored as a single session. Presentation server 104 is configured to control access to the various sessions information.

In the embodiment depicted in FIG. 1, a user uses a computing device 108 ("note-taking device 108") to take notes. The notes may include text, figures, etc. entered by the user. According to an embodiment of the present invention, the notes may also include portions of recorded information (e.g., multimedia streams or objects). Examples of note-taking device 108 include a personal computer, a portable or laptop computer, a personal digital assistant (PDA), a tablet PC, etc. The user or note-taker may use an application ("composing application 110") 110 executing on note-taking device 108 to take notes in a document 112 ("notes document") created by composing application 110. Examples of composing applications 110 include applications such as Microsoft Word™, Microsoft Excel™, WordPerfect™, text editors (e.g., TextEdit, WinEdit), and the like. Any application that can be used to create or open a document and write information to the document can be classified as a composing application. For example, the user may open a document 112 using Microsoft Word™ executing on note-taking device 108 and take notes in the document. The notes document 112 may be stored on note-taking device 108.

According to an embodiment of the present invention, while taking notes during a presentation, a user can specify that portions of information recorded by capture devices 102 during the presentation be incorporated or inserted into the user's notes. The portion may correspond to a slide or other image, an audio segment, a video segment, a text segment (e.g., user contributed text notes), etc. A portion may correspond to a multimedia object included in the information captured by information capture devices 102. For example, the user may request that: a slide being presently shown on a projection device be inserted at a particular location in the user's notes; an audio segment comprising the last 5-minutes of recorded audio information be inserted into the user's notes; a video clip being presently shown be inserted into the user's notes; and the like. Embodiments of the present invention thus enable a user to incorporate information recorded during a presentation or portions thereof into the user's notes while the presentation is proceeding. Recorded information of various types that is captured during the presentation may be incorporated into the user's notes. Details related to how a user can incorporate such information in the user's notes are provided below.

Whether or not a user's request to insert information in the notes can be processed generally depends upon whether note-taking device 108 can communicate with presentation server 104 and receive the requested information for presentation server 104. Note-taking device 108 may or may not be communicatively coupled (i.e., can communicate with presentation server 104) to presentation server 104. This on/off nature of the connection between note-taking device 108 and presentation server 104 is indicated by dotted line 114 depicted in FIG. 1. For example, note-taking device 108 may be connected or may not be connected to presentation server 104 during (or after) a presentation when the user is taking notes using note-taking device 108. The connection between the note-taking device 108 and the presentation server 104 may be volatile in some situations where it comes and goes (e.g., a weak wireless connection) during a presentation.

When note-taking device 108 is connected to presentation server 104, then note-taking device 108 can access information recorded during the presentation by information capture devices 102 and pushed to presentation server 104. Note-taking device 108 may not have access to the captured information when not connected to presentation server 104. According to the teachings of the present invention, the ability of a user to take notes, including specifying portions of the captured information to be inserted in the notes, is not dependent on whether or not note-taking device 108 is communicatively coupled to presentation server 104 (i.e., not dependent on whether note-taking device 108 has access to the captured information or not).

According to an embodiment of the present invention, when note-taking device 108 can communicate with presentation server 104, user requests for portions of recorded information to be incorporated into the user's notes are communicated from note-taking device 108 to presentation server 104. Presentation server 104 responds to the requests by sending the request information portions to note-taking device 108. The requested information portions received from the presentation server 104 are then incorporated into the user's notes in locations identified by the user. In this manner, portions of the information being recorded during the presentation can be inserted into the user's notes during the presentation.

According to an embodiment of the present invention, when note-taking device 108 cannot communicate with presentation server 104, user requests for portions of recorded information to be incorporated into the user's notes are cached (or stored) in the notes document that the user is composing. Information identifying locations within the notes document where the requested information portions are to be placed may also be cached in the notes document. A visible place holder or marker may be placed in the notes document at a location where the requested information is to be inserted. The place holder or marker may indicate contextual information (e.g., a slide number from a particular session) regarding the requested information. Accordingly, a user need not have access to the recorded information when the information request is made.

Information requests that are cached in the notes document are then processed at a later time. For example, the cached requests may be automatically processed when note-taking device 108 detects that communication with presentation server 104 has been established. Note-taking device 108 may periodically check if communication with the presentation server 104 has been established. The check to determine if communication has been established may be performed upon receiving a signal generated in response to a user action (e.g., user opens the notes document, user explicitly requests a communication check) or in response to an automated signal (e.g., a signal generated by a timer, a signal generated in response to some event related to the notes document).

As described above, the information recorded by information capture devices 102 and pushed to presentation server 104 may be stored and organized into sessions. According to an embodiment of the present invention, a user's access to the recorded information is regulated on a per session basis. In this embodiment, a user or note-taker is allowed to request information stored in a session only if the user is authorized to access information from that session. As a result, in this embodiment, a user has to secure authorization for a session before the user request recorded information from the session.

In the embodiment depicted in FIG. 1, authorization device 116, presentation server 104, and an authorization module 118 executing on note-taking device 108 perform the authorization operations. In this embodiment, a user gains authorization by logging in using authorization module 118 and authorization device 116. Authorization module 118 is independent of composing application 110.

According to an embodiment of the present invention, the authorization process is initiated when authorization module 118 communicates login information from the user's note-taking device 108 to authorization device 116 which in turn communicates the information to presentation server 104. The login information may include username information, IP address of note-taking device 108, clock information of the note-taking device 108, and other information used for authorization.

Presentation server 104 responds by communicating authorization information to authorization device 116 which in turn communicates the information to note-taking device 108. According to an embodiment of the present invention, the authorization information comprises a session identifier that identifies the session for which authorization is granted for the user. For example, if the user is attending a presentation, the session identifier may identify a session storing information recorded for the presentation that the user is attending. Presentation server 104 may also communicate other information as part of the authorization information such as a login key, the presentation server's host IP address that the note-taking device 108 can use to communicate with the presentation server 104, and other information. Presentation server 104 can be configured to implement several strategies of authorization depending on the access level of a session in a manner similar to those of a file system protection. According to an embodiment of the present invention, if a session is declared private, only password protected users are authorized to access session information. These password protected user accounts may be created in advance through another process such as conference registration and made known to the user. Alternatively, a login account may be dynamically created if the authorization request is received through an infrared authorization device during the presentation. If a session is declared public, then any authorization request is granted.

A user may be also gain authorization to multiple sessions. For example, in addition to the current session storing recorded information for the current presentation that the user is attending, the user may have previously attended three other presentations and gotten authorization to sessions storing recorded information for the three presentations. Different session identifiers may be used to identify different sessions. Presentation server 104 may store a list of authorized session identifiers for each user. The status of the login/authorization process may also be output to the user using note-taking device 108.

According to an embodiment of the present invention, infrared (IR) technology may be used to accomplish the authorization process. For example, authorization device 116 may be an IR receiver/transmitter and authorization module 118 may be an IR module configured to communicate with an IR receiver. In one such embodiment, IR module 118 may be configured to automatically start when note-taking device 108 is started (e.g., when a laptop boots up). IR Module 118 is configured to monitor the IR port on note-taking device 108 and send protocol information to an IR authorization device 116 when it comes within range of authorization device. For example, in one embodiment, when a note-taking device 108 comprising an IR module 118 comes within range of an IR authorization device 116, it sends the username information, note-taking device's IP address, and clock information to authorization device 116. In return, note-taking device 108 receives a session identifier and other information (e.g., a login key, presentation server's IP address) from authorization device 116. In one embodiment, the IR authorization module 118 is implemented using VC++ (Visual C++) and IR communication is based on IR sockets.

As stated above, the status of the login/authorization process may also be output to the user using note-taking device 108. For example, in the case where authorization module 118 is automatically initiated by detecting an IR authorization device 116 in alignment, a message may be displayed on the note-taking device 108 indicating success or failure of the login/authorization process. An audible signal (e.g., a bell sound) may also be used to indicate the status of the login and authorization.

Using IR technology, the physical presence/location of the user's note-taking device 108 may initiate the authorization and login process. For example, one or more IR authorization devices 116 may be placed at convenient locations in a conference room. When the conference room is used for a presentation, attendees of the presentation may automatically login and gain access to information recorded for the presentation by bringing their note-taking devices within range of the IR authorization devices 116.

As another example, in an environment where a table is used for meetings, IR authorization devices 116 may be placed on the table. When people attending a meeting sit down around the table and start their note-taking devices 108, they are automatically logged in when the IR authorization modules 118 executing on their note-taking devices 108 come within range of the IR authorization devices 116. In this manner, an "intelligent" environment may be created that facilitates recording of information and note-taking according to the teachings of the present invention.

Various other technologies besides IR technology may also be used to accomplish the login and authorization process. For example, a web page may be provided for the user to login and gain authorization.

Figure 2:
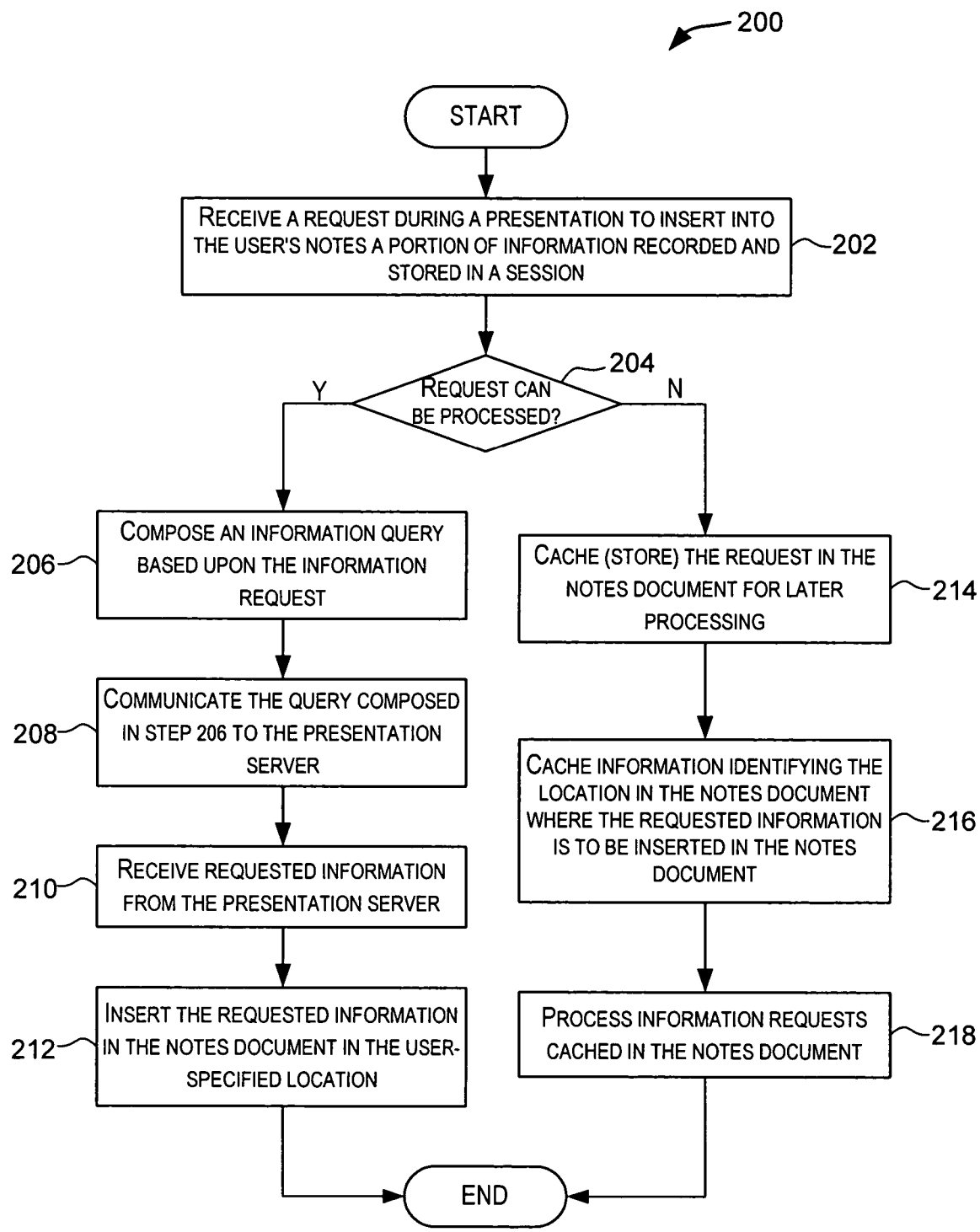
FIG. 2 is a simplified high-level flowchart depicting a method of processing requests for inserting recorded information in a user's notes document according to an embodiment of the present invention.

FIG. 2 is a simplified high-level flowchart 200 depicting a method of processing requests for inserting recorded information in a user's notes document according to an embodiment of the present invention. The method depicted in FIG. 2 may be performed by software modules executed by note-taking device 108, hardware modules of note-taking device 108, or combinations thereof. Flowchart 200 depicted in FIG. 2 is merely illustrative of an embodiment of the present invention and is not intended to limit the scope of the present invention. Other variations, modifications, and alternatives are also within the scope of the present invention.

As depicted in FIG. 2, processing is initiated in step 202 upon receiving a request during a presentation to insert into the user's notes a portion of information recorded and stored in a session. The request may identify the type of information requested, for example, a slide or other image, an audio segment, a video segment, a text segment, etc. Multiple types of information (e.g., a slide along with an audio clip) may be requested in a single request. The request may also identify a particular location within the note-takers' notes document where the requested information is to be inserted. The request may include information specifying a session identifier identifying a session from which information is requested. The session identifier may identify a session storing information for the presentation in progress or any other session storing information recorded from a previous presentation to which the user has gained authorization. According to an embodiment of the present invention, each information request received in step 202 is assigned a unique request identifier.

The information request in step 202 may be received at any time whether or not note-taking device 108 is communicatively coupled to presentation server 104. Accordingly, the user can request the information while taking notes irrespective of whether the requested information is accessible to note-taking device 108.

A note-taker may use various techniques to configure a request. In one embodiment, a user interface may be displayed on note-taking device 108 that allows the user to specify information to be incorporated into the user's notes. The user interface for specifying the information to be inserted may be integrated with the user interface provided by composing application 110 that is used to take the notes. For example, the user interface of a composing application 110 such as Microsoft Word™ may be customized to provide options (e.g., buttons, menus, etc.) that allow a user to configure requests requesting a portion of recorded information to be inserted into the user's notes. One such embodiment is described below in further detail.

According to one technique, the information to be inserted into the user's notes may be based upon the time when the user makes the request and the type of information selected by the user. In this embodiment, user-selectable options (e.g., buttons, menus, etc.) may be provided which allow the user to select the type (e.g., slide, audio segment) of recorded information to be incorporated into the user's notes. In this embodiment, the selected information type along with the time when the selection is made and the session identifier form the information request. According to an embodiment of the present invention, the location of the cursor within the notes document when the option is selected indicates the location in the notes document where the requested information is to be placed.

For example, a plurality of buttons may be displayed each corresponding to an information type such as slides, audio, video, text, etc. If the user wants to insert the presently displayed slide in the user's notes, the user can move the cursor to a location in the notes document where the slide is to be inserted and then select the "slides" button. This generates an information request requesting that the currently displayed slide (i.e., the slide being displayed when the user selected the "slides" button) be inserted in the cursor location in the user's notes. The user may select other buttons corresponding to the other types of information to configure requests to insert portions of those particular types of information. For example, if the user selects the "audio" button, then a request for audio information is generated. The amount of audio information requested may be based upon the time when the request was made. In one embodiment, a predetermined and user configurable time buffer relative to the time of selection (e.g., 1 minute prior to the time of selection) may be used to identify the amount of audio information to be incorporated. In other embodiments, the user may be allowed to specify the time length of the audio information to be inserted in the user's notes.

According to another technique, a user may specifically identify the information to be incorporated into the user's notes. For example, the user may specify a slide number identifying a slide (which may have been previously displayed during the presentation) to be inserted into the user's notes. Likewise, the user may specify a portion of other types of recorded information (e.g., video clip shown during the first 5 minutes of the presentation, audio information spoken by a particular speaker during the presentation) to incorporated into the user's notes.

As described earlier, in some embodiments of the present invention, a user may be authorized to access information from multiple sessions. For example, in addition to the presently recorded session, the user may also be authorized to access information from other previously recorded sessions. In such embodiments, the user can configure requests requesting information not only from a session corresponding to the present presentation but also from other sessions. For each request, the user may specify the session (e.g., using a session identifier) from which information is requested.

In step 204, it is determined if the information request received in step 202 can be processed. A request can be processed if the requested information is accessible to note-taking device 108. The requested information may be accessible via presentation server 104 or in some situations may be accessible locally (i.e., if the requested information is locally cached on note-taking device 108). A request cannot be processed if the requested information is not accessible.

Accordingly, in most situations, whether or not a user's request to insert information in the notes can be processed generally depends upon whether note-taking device 108 can communicate with presentation server 104 and receive the requested information from presentation server 104. In one embodiment, the request can be processed if note-taking device 108 can communicate with presentation server 104. Accordingly, a check is made in step 204 to see if the note-taking device 108 and presentation server 104 can communicate with each other. If it is determined that the note-taking device 108 and presentation server 104 can communicate with each other, then it is deemed that the request can be processed and processing continues with step 206. If it is determined that the note-taking device 108 and presentation server 104 cannot communicate with each, then it is deemed that the request cannot be processed and processing continues with step 214.

In certain situations, it may be determined in step 204 that the information request received in step 202 cannot be processed even though the note-taking device 108 and presentation server 104 can communicate with each other. For example, the information requested may not yet be available. In this situation processing continues with step 214.

In step 206, an information query is composed based upon the information request. According to an embodiment of the present invention, the information query comprises a session identifier identifying the session from which information is requested, a login key received during authorization, and information identifying the requested information. The query composed in step 206 is then communicated to the presentation server 104 in step 208.

Upon receiving a query from a note-taking device 108, presentation server 104 determines if the user is authorized to access the requested information. The query is not processed if the requested information is part of a session which the user is not authorized to access. If the user is authorized, then presentation server 104 determines the requested information and communicates the requested information to the note-taking device that was the source of the information request. Accordingly, in step 210, the note-taking device 108 receives the requested information from presentation server 104. In step 212, the requested information received in step 210 is inserted into the notes document in the user-specified location. This terminates the processing of the request received in step 202.

As previously indicated, various different types of recorded information (e.g., slides, images, text, audio information, video information) may be requested and inserted in the user's notes document. According to an embodiment of the present invention, when audio information is inserted in the notes document, a small icon is placed in the notes document where the information is inserted. Clicking on the audio icon automatically opens the inserted audio clip for playback using a preferred player.

According to an embodiment of the present invention, the inserted data is actually embedded in the notes document—this is substantially different from hyperlinks that provide links to data. As a result, various operations that can ordinarily be performed on a document can be performed on the notes document. For example, the document can be copied, distributed, etc. In one embodiment, the authorization to access session information is stored separately from the document; thereby allowing distribution of selective data without giving access to the entire session. It should be noted that a user can take notes and include portions of recorded information from different presentations in a single document.

If it is determined in step 204 that the request received in step 202 cannot be processed at that time, then in step 214, the request is stored or cached in the notes document for later processing. Multiple unprocessed information requests may be cached in the notes document. In one embodiment, each cached request is stored as a property associated with the notes document. For example, the request may be stored as custom properties of the document (e.g., the "CustomDocumentProperties" associated with a Microsoft Word™ document). Each cached request may be assigned a unique identifier, e.g., "mrRequest#", where # is a unique request identifier. Uniqueness of cached request identifiers in a notes document is preserved. For each cached request, the data type associated with the request, the request time, and other additional information associated with the request may also be stored.

Information identifying the location in the notes document where the requested information is to be inserted may also be cached in the notes document in step 216. In one embodiment, the location is cached as a bookmark in the notes document. According to an embodiment of the present invention, a visible mark or cue is placed in the notes document where the information requested by the cached request is to be inserted. The visible mark acts as a reminder to the user that information corresponding to an unprocessed request is to be inserted in that location. The visible mark may also provide information identifying the requested information.

The information requests that are cached in the notes document are then processed at a later time, as indicated in step 218. For example, the cached requests may be automatically processed when note-taking device 108 detects that communication with presentation server 104 has been established. In one embodiment, note-taking device 108 may be configured to periodically check communications between note-taking device 108 and presentation server 104 in order to automatically process the cached requests when communication is established.

In another embodiment, an attempt to process cached requests may be made by note-taking device 108 responsive to various stimuli. For example, such an attempt may be made upon receiving a signal generated in response to a user action (e.g., user opens the notes document, user explicitly requests a communication check). The signal may also be automatically generated, e.g., a signal generated by a timer on a periodic basis, a signal generated in response to some event related to the notes document. Upon receiving the signal, note-taking device 108 may be configured to check communications between the note-taking device 108 and the presentation server 104 and to process cached requests if communications are possible.

When the cached requests are processed in step 218, the processing performed in steps 206, 208, 210, and 212 is performed for the cached requests. After a request is processed, it is removed from the cache.

If an error occurs as a result of processing, the request is also removed from the cache and an error message inserted at the location where the requested information would have been inserted. In one embodiment, an error may occur when a user tries to request information from an unauthorized session, or when the user makes a request for a current slide when no presentation is being captured. The errors can be detected in a number of ways. In one embodiment, a process error is detected by note-taking device 108 when receiving an explicit error signal from presentation server 104 as a result of request processing.

Microsoft Word™ Embodiment

This section describes an embodiment of the present invention wherein a Microsoft Word™ composing application is used to take notes according to the teachings of the present invention. This embodiment is not intended to limit the scope of the present invention as recited in the claims. The teachings of the present invention can also be used with other composing applications.

In this embodiment, code modules are provided on the note-taking device 108 that provide the note-taking functionality of the present invention and run inside any standard Microsoft Word™ package. These code modules and forms, along with other layout and formatting guidelines may be saved and distributed as a Word template file. These modules cause a menu interface to be shown inside Microsoft Word™ that allows users to configure requests for recorded information. For example, a user can specify a slide, an audio segment, a video clip, etc. to be incorporated into the user's notes during a presentation. The modules provide the functionality needed to support user information requests for inserting portions of recorded information in the user's notes. In one embodiment, the modules that run on note-taking device 108 are implemented using Visual Basic for Applications (VBA).

Figure 3:
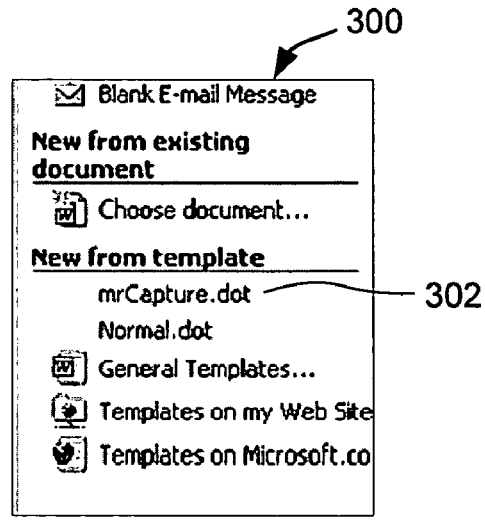
FIG. 3 depicts a list of templates including a template that provides note-taking functionality according to an embodiment of the present invention.

As described above, modules implementing the note-taking functionality according to the teachings of the present invention may be distributed as a Word template file. Any document opened with this template will have the note-taking functionality of the present invention. For example, when a new document is to be opened for taking notes using Microsoft Word™, the user can select the template that provides the functionality of the present invention to open the document. As depicted in FIG. 3, a list 300 of templates may be displayed to the user and the user can select can select a template 302 (the "mrCapture.dot" template) which provides the note-taking functionality according to the teachings of the present invention.

Figure 4:
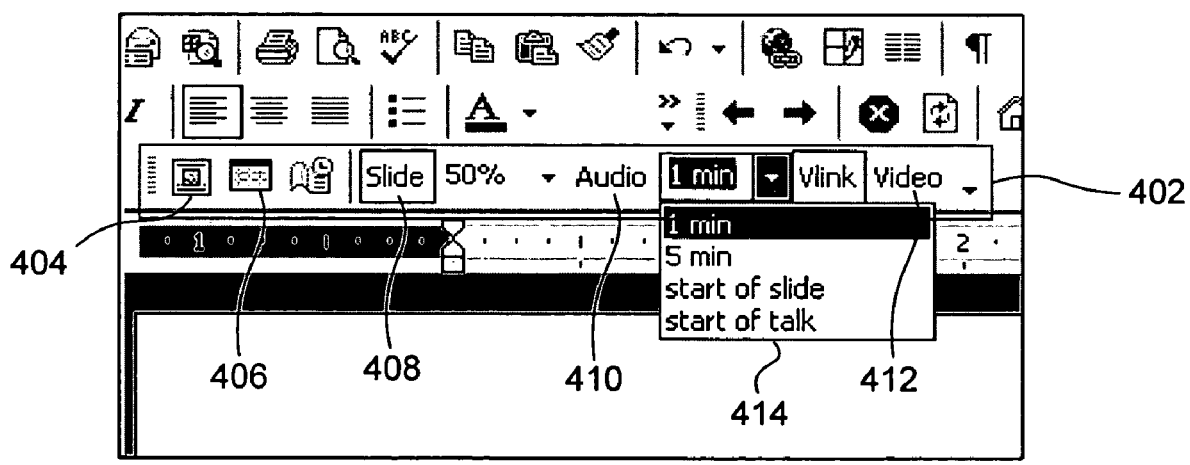
FIG. 4 depicts a section of a Microsoft Word™ tool bar showing a menu bar comprising user-selectable options for inserting portions of recorded information into a notes document according to an embodiment of the present invention.

When a Microsoft Word™ document is opened using the "mrCapture.dot" template, a new menu bar providing options for specifying information to be inserted into the notes document are added to the Microsoft Word™ tool bar. FIG. 4 depicts a section of a Microsoft Word™ tool bar showing a menu bar 402 comprising user-selectable options for inserting portions of recorded information into a notes document according to an embodiment of the present invention. In the embodiment depicted in FIG. 4, menu bar 402 comprises several buttons and toggles: button ("Insert") 404, button ("Calendar") 406, "Slide" toggle 408, "Audio" toggle 410, and "Video" button 412. The user can select "Slide" toggle 408 to indicate that the presently displayed slide should be inserted in the user's notes document. The position of the cursor within the notes document at the time when "Slides" toggle 408 is clicked indicates the position in the document where the slide is to be inserted. Likewise, the user can set "Audio" toggle 410 to indicate that an audio segment is to be inserted. Users can configure the length of audio clip to be inserted using pull-down menu 414 associated with "Audio" toggle 410. When the user clicks the "Insert" button 404, the specified information will be inserted in the user's notes document at the position of the cursor. It should be apparent that buttons and/or toggles for other types of information may be provided in other embodiments of the present invention.

Figure 5:
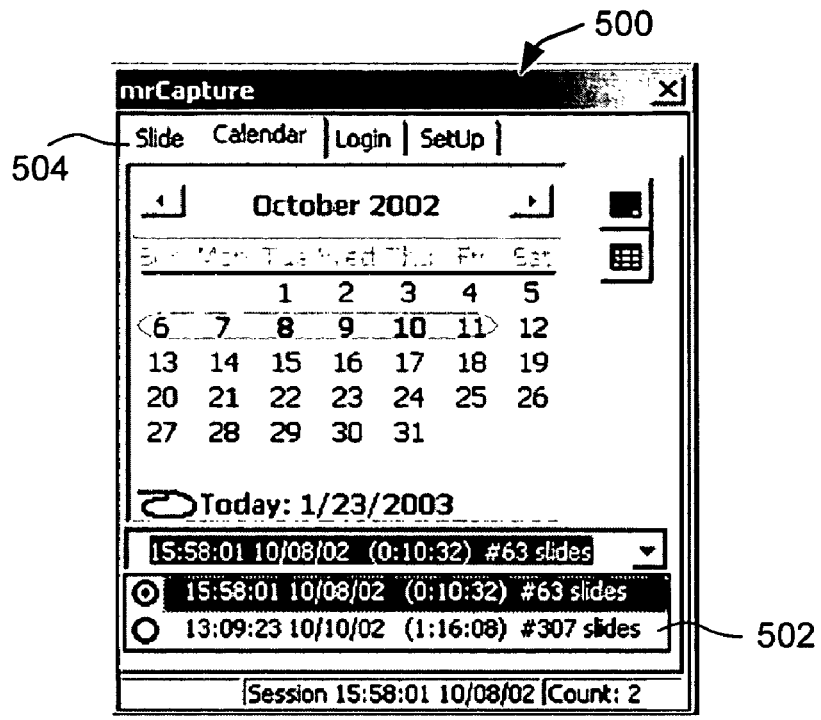
FIG. 5 depicts a user interface that displays information regarding sessions that the user is authorized to access information from according to an embodiment of the present invention.

As previously described, a user can be authorized to access information from multiple sessions and can incorporate portions of recorded information from these sessions into the user's notes. Selecting ("Calendar") button 406 in FIG. 4 brings up a dialog box 500 as depicted in FIG. 5 that displays information regarding the various other sessions from which the user is authorized to access information according to an embodiment of the present invention. A calendar interface is displayed in FIG. 5. The user can select a range of dates from the calendar interface. As shown in FIG. 5, the user has selected a range of days including Oct. 6, 2002 to Oct. 11, 2002. A list of sessions 502 that a user is authorized to access within the selected range of days is displayed. Summary information for each session is displayed including the starting time of the recording included in the session, the duration of the session information, and the number of slides included in the session information.

While attending and taking notes for a presentation, the user can specify that a portion of recorded information from another presentation, which is stored as another session to which the user is authorized, be inserted into the user's notes. The user can specify the particular session from which information is to be inserted. For example, in FIG. 5, the user can select one of the sessions displayed in list 502. The user can then specify the portion of information to be inserted. For example, the user can specify a slide number to be inserted.

If the recorded information for user-selected session is accessible to the note-taking device used by the user, then the recorded information from that session may be displayed to the user on the note-taking device 108 and the user can then pick and chose the information to be inserted in the user's notes. The recorded information for the selected session may be stored by presentation server 104 and accessible to note-taking device 108 via server 104. In some embodiments, the recorded information for sessions which are authorized for the user may be downloaded to the user's note-taking device and cached in the note-taking device's memory. According to an embodiment of the present invention, the download may be performed when the user logs in and get authorized for accessing information recorded for the present presentation.

Figure 6:
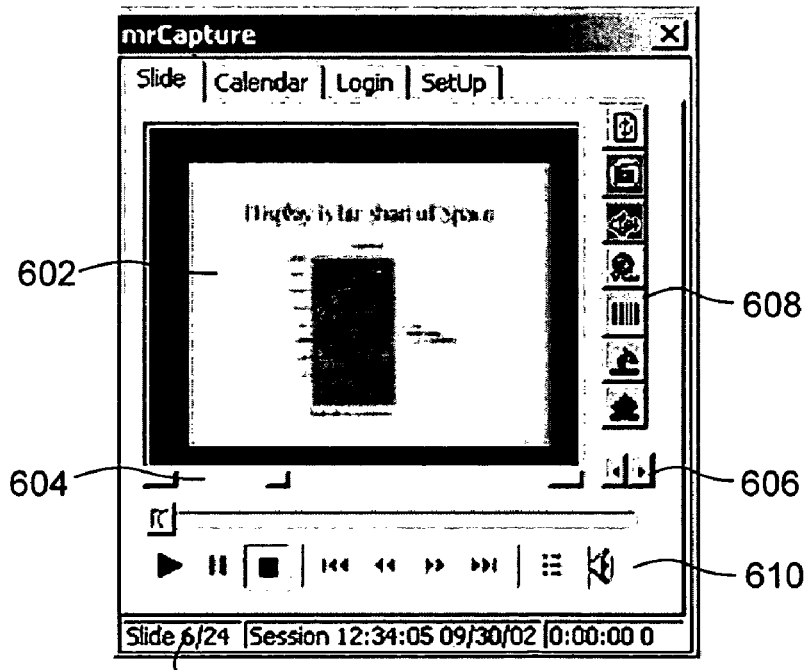
FIG. 6 displays a user interface that allows a user to browse through previously recorded session information when the information is accessible to the user's note-taking device according to an embodiment of the present invention.

FIG. 6 displays a user interface that allows a user to browse through previously recorded session information when the information is accessible to the user's note-taking device according to an embodiment of the present invention. Once the user has selected a session using the user interface depicted in FIG. 5, the user can select "Slide" tab 504 to bring up the user interface displayed in FIG. 6 which displays slides recorded for the selected session. As shown, recorded slides are displayed in window 602. The user can browse through the slides using slider 604 or step through them one at a time using previous and next buttons 606. Several control buttons 608 are provided for inserting a slide or audio segment into the user's notes. Controls 610 are also provided for playing back the recorded information stored for the session. A slide counter 612 is also displayed.

If information for a selected slide is accessible to the note-taking device, either via presentation server 104 or cached on the note-taking device itself, the request for the selected slide is immediately processed and the requested data is inserted into the user's notes document. If the request information is not accessible, then the information request is cached in the notes document, and processed later when the requested information becomes accessible, as described above.

As described above, the user interfaces depicted in FIGS. 5 and 6, and described above allow the user to specify information to be inserted into the user notes from previously recorded sessions which the user is authorized to access. The user interfaces can also be used to view and select information previously displayed during the present presentation that the user is attending and which is stored as part of the current session. For example, using the interface depicted in FIG. 6, the user can step back through slides that have already been displayed in the presentation the user is attending and select a slide for insertion in the user's notes. As new slides are displayed during the presentation, slide counter 612 is updated to include the new slides.

Figure 7A:
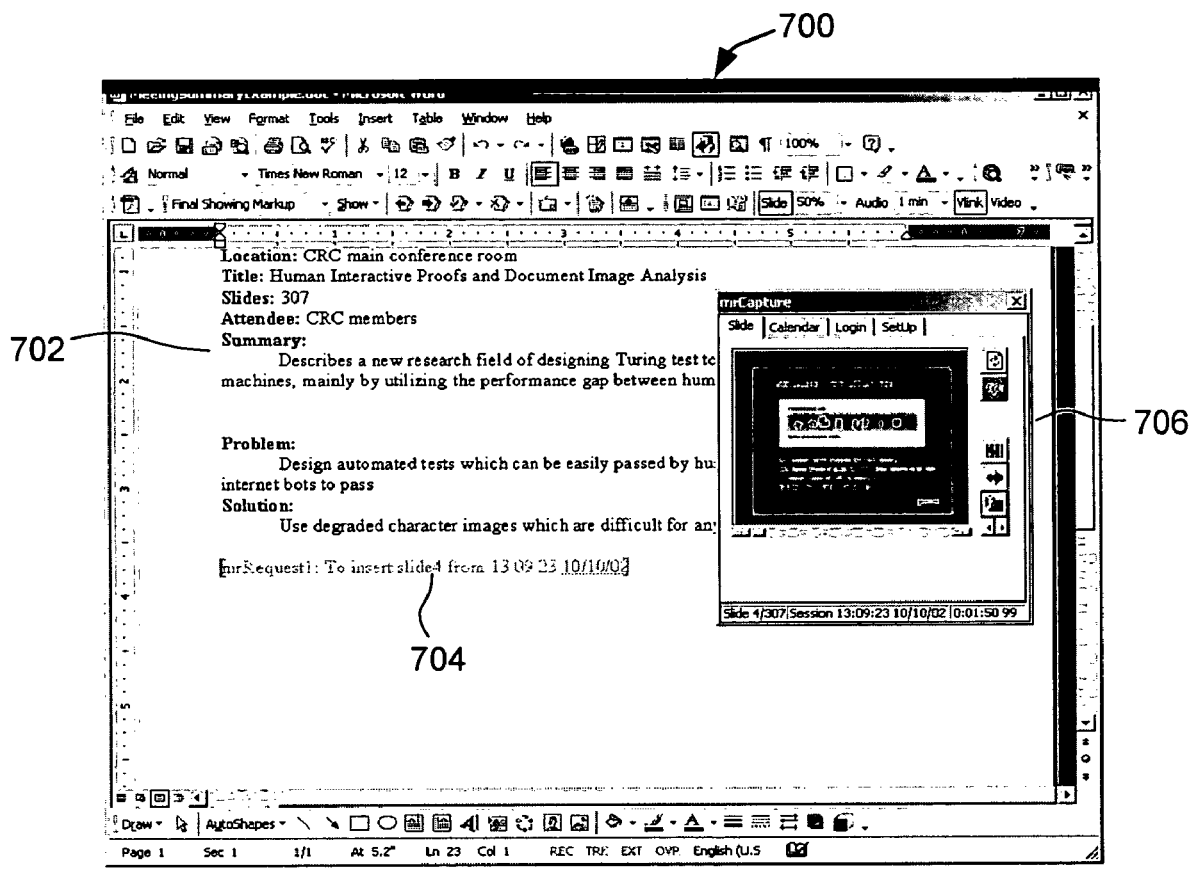
FIG. 7A depicts a Microsoft Word™ interface 700 that has been configured to provide options for taking notes and that display a notes document with a cached request according to an embodiment of the present invention.

FIG. 7A depicts a Microsoft Word™ interface 700 that has been configured to provide options for taking notes according to an embodiment of the present invention. Interface 700 displays a section 702 of a user's notes document. As shown, a visible marker 704 is displayed in the notes document corresponding to an information request that has not yet been processed and is accordingly stored or cached in the notes document. Visible marker 704 is placed in a location where the information requested by the cached information request is to be inserted. Visible marker 704 provides a context of the requested information such as "[mrRequest1: To be inserted slide4 from 13:09:23 10/1/0/02]". The user may have requested the information to be inserted using dialog window 706 (which is similar to the user interface depicted in FIG. 6 and described above). The information request is stored in the notes document until the request can be processed, i.e., the information requested by the request can be accessed and inserted into the notes document.

Figure 7B:
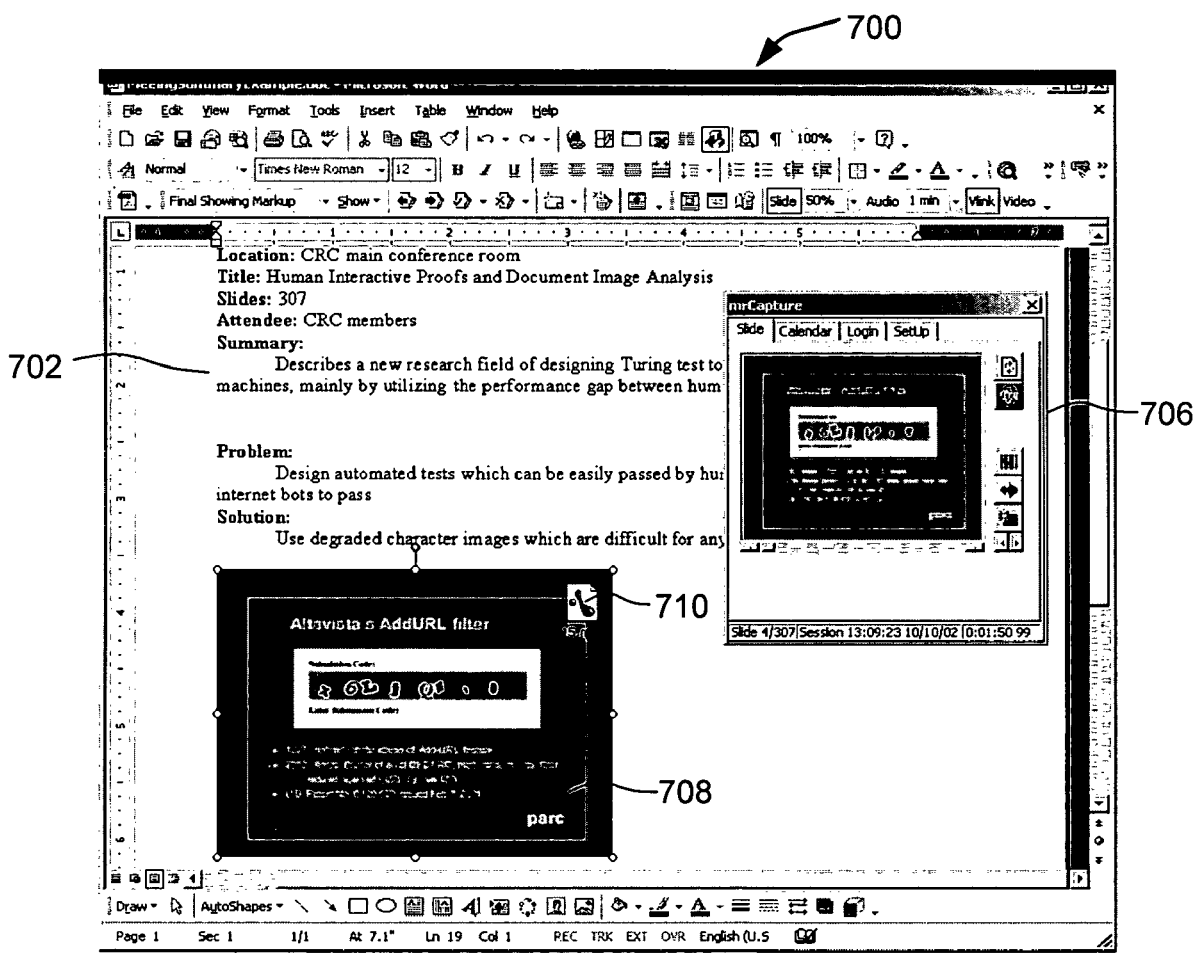
FIG. 7B depicts the notes document of FIG. 7A wherein the cached information request has been processed according to an embodiment of the present invention.

FIG. 7B depicts the notes document of FIG. 7A wherein the cached information request has been processed according to an embodiment of the present invention. As shown, a slide 708 corresponding to the cached information request has been inserted into the notes document at the specified location. Visible marker 704 has accordingly been automatically removed and replaced by the requested slide 708. Audio information associated with the inserted slide has also been inserted into the notes document as indicated by icon 710. The user can playback the audio segment by clicking or selecting icon 710.

As described above, the code modules that provide the functionality needed to support user information requests for inserting portions of recorded information in the user's notes may be implemented in Visual Basic for Applications (VBA) that is supported as part of the standard Microsoft Office Suite™. Several code modules may be provided. For example, a "user request module" may be provided that provides the functionality needed to support user information requests such as inserting slides, audio segments, and so on. The "user request module" may interact with different types of objects including a Word document object, a user request object, and a presentation or session object.

According to an embodiment of the present invention, the user request object is a class object that handles creation of a user information request (e.g., a request created using the interfaces depicted in FIGS. 5 and 6), processing the user information request to obtain the requested information and inserting the information in the notes document, caching the request when it cannot be processed, and loading in cached requests during module startup. The session object comprises information about presentations (or sessions) and is configured for formulating a query for the information request, communicating the query to the presentation server 104, receiving requested information from the presentation server 104, managing cached sessions on the note-taking device, and processing of login keys. The Word object is part of the Microsoft Office Object Model that is provided for manipulation of document elements.

Figure 8:
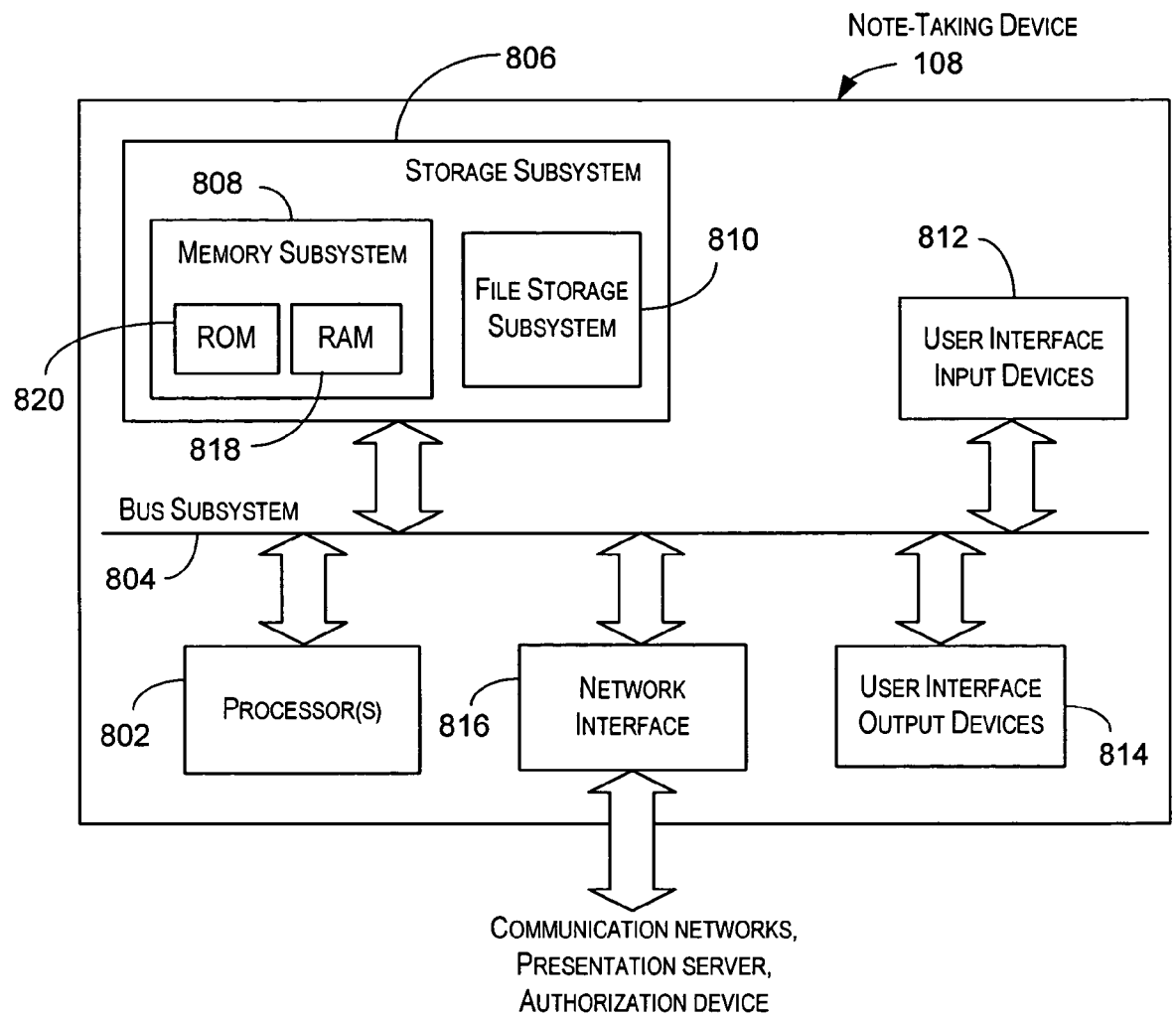
FIG. 8 is a simplified block diagram of a note-taking device 108 that may be used to perform processing according to an embodiment of the present invention.

FIG. 8 is a simplified block diagram of a note-taking device 108 that may be used to perform processing according to an embodiment of the present invention. As shown in FIG. 8, note-taking device 108 includes at least one processor 802, which communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816. The input and output devices allow user interaction with data processing system 802.

Network interface subsystem 816 provides an interface to other computer systems such as presentation server 104 and authorization device 116. The networks may include the Internet, a local area network (LAN), a wide area network (WAN), a wireless network, an intranet, a private network, a public network, a switched network, or any other suitable communication network. Network interface subsystem 816 serves as an interface for receiving data from other sources and for transmitting data to other sources from note-taking device 108. For example, note-taking device 108 may send information requests to presentation server 104 and receive the requested information from presentation server 104 via network interface subsystem 816. Embodiments of network interface subsystem 816 include an Ethernet card, a modem (telephone, satellite, cable, ISDN, etc.), (asynchronous) digital subscriber line (DSL) units, and the like.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to note-taking device 108. A user may use user input devices 812 to take notes.

User interface output devices 814 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from note-taking device 108.

Storage subsystem 806 may be configured to store the basic programming and data constructs and modules that provide the functionality of the present invention. For example, software modules such as authorization module 118 may be stored in storage subsystem 806. These software modules may be executed by processor(s) 802. Storage subsystem 806 may also provide a repository for storing data used in accordance with the present invention. For example, the notes documents, cached sessions information, etc. may be stored in storage subsystem 806. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 804 provides a mechanism for letting the various components and subsystems of note-taking device 108 communicate with each other as intended. Although bus subsystem 804 is shown schematically as a single bus, alternative embodiments of the bus subsystem may utilize multiple busses.

As previously stated, note-taking device 108 can be of varying types including a personal computer, a portable computer, a laptop, a kiosk, a PDA, a tablet PC, and the like. The description of note-taking device 108 depicted in FIG. 8 is intended only as a specific example. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of taking notes in a notes document using a note-taking device, the method comprising:
   generating a first request at the note-taking device during a first presentation, wherein the first request identifies a portion of a first information captured during the first presentation to insert in a first location in the notes document, the first information comprising information captured by one or more capture devices while the first presentation is proceeding;
   determining if the note-taking device can communicate with a server configured to communicate one or more portions of the information captured by the one or more capture devices;
   storing the first request in the notes document upon determining that the note-taking device cannot communicate with the server;
   determining, subsequent to storing the first request in the notes document, if the note-taking device can communicate with the server; and
   communicating the first request from the note-taking device to the server upon determining that the note-taking device can communicate with the server;
   wherein the note-taking device is a computing device that enables a user to enter notes.

2. The method of claim 1 wherein determining if the note-taking device can communicate with the server comprises:
   detecting a first signal after storing the first request in the notes document; and
   determining if the note-taking device can communicate with the server responsive to the first signal.

3. The method of claim 2 wherein the first signal is generated when the notes document is opened.

4. The method of claim 2 wherein the first signal is generated at a periodic interval.

5. The method of claim 2 wherein the first signal is generated in response to an action performed by a user of the note-taking device.

6. The method of claim 1 further comprising:
   communicating the first request from the note-taking device to the server;
   receiving, at the note-taking device, the portion of the first information from the server; and
   embedding the portion of the first information in the first location in the notes document.

7. The method of claim 6 further comprising:
   communicating, from the note-taking device to the server, information identifying a user of the note-taking device requesting the portion of the first information;
   determining, at the server, if the user is authorized to receive the portion of the first information; and communicating the portion of the first information from the server to the note-taking device if it is determined that the user is authorized to receive the portion of the first information.

8. The method of claim 1 further comprising:
communicating, from the note-taking device to a server, information identifying a user of the note-taking device requesting the portion of the first information; and
determining, at the server, if the user is authorized to receive the portion of the first information.

9. The method of claim 1 further comprising:
determining one or more requests stored in the notes document, the one or more requests including the first request;
communicating the first request from the note-taking device to a server;
receiving, at the note-taking device from the server, the portion of the first information; and
embedding the portion of the first information in the first location in the notes document.

10. The method of claim 9 wherein the portion of the first information is a slide displayed during the first presentation.

11. The method of claim 9 wherein the portion of the first information is at least one of an audio segment recorded during the first presentation and a video segment recorded during the first presentation.

12. The method of claim 9 wherein the portion of the first information is at least one of an image displayed during the first presentation, and text information recorded during the first presentation.

13. The method of claim 1 wherein storing the first request in the notes document comprises:
inserting a visual marker in the first location in the notes document indicative of the first request.

14. The method of claim 1 further comprising:
generating, at the note-taking device during the first presentation, a second request to insert a portion of a second information in a second location in the notes document, the second information comprising information captured during a second presentation;
determining if the portion of the second information requested by the second request is accessible to the note-taking device; and
storing the second request in the notes document upon determining that the portion of the second information requested by the second request is not accessible to the note-taking device.

15. The method of claim 14 further comprising:
identifying one or more requests stored in the notes document, the one or more requests including the first request and the second request;
communicating the first request and the second request from the note-taking device to a server;
receiving, at the note-taking device from the server, the portion of the first information and the portion of the second information;
embedding the portion of the first information in the first location in the notes document; and
embedding the portion of the second information in the second location in the notes document.

16. A system for taking notes comprising:
a server configured to respond to requests requesting portions of stored information, wherein the request comprises a first request generated during a first presentation and the first request identifies a first portion of the stored information captured during the first presentation to insert in the first location of the notes document, and the stored information comprises first information captured by one or more capture devices while the first presentation is proceeding; and
a note-taking device for taking notes,
wherein the note-taking device is configured to execute a composing application that creates a notes document for storing the notes,
wherein the note-taking device is configured to accept a first request to insert a portion of the first information in a first location in the notes document,
wherein the note-taking device is configured to store the first request in the notes document upon determining that the note-taking device cannot communicate with the server;
wherein the note-taking device is configured to determine, subsequent to storing the first request in the notes document, if the note-taking device can communicate with the server;
wherein the note-taking device is configured to communicate the first request from the note-taking device to the server upon determining that the note-taking device can communicate with the server; and
wherein the note-taking device is a computing device that enables a user to enter notes.

17. The system of claim 16 wherein the note-taking device is configured to:
detect a first signal after storing the first request in the notes document; and
determine if the note-taking device can communicate with the server responsive to the first signal.

18. The system of claim 17 wherein the first signal is generated when the notes document is opened.

19. The system of claim 17 wherein the first signal is generated at a periodic interval.

20. The system of claim 17 wherein the first signal is generated in response to an action performed by a user of the note-taking device.

21. The system of claim 16 wherein the note-taking device is configured to:
communicate the first request to the server;
receive the portion of the first information from the server; and
embed the portion of the first information in the first location in the notes document.

22. The system of claim 21 wherein:
the note-taking device is configured to communicate information identifying a user of the note-taking device requesting the portion of the first information to the server; and
the server is configured to determine if the user is authorized to receive the portion of the first information, and to communicate the portion of the first information to the note-taking device if it is determined that the user is authorized to receive the portion of the first information.

23. The system of claim 16 wherein:
the note-taking device is configured to communicate information identifying a user of the note-taking device requesting the portion of the first information to the server; and
the server is configured to determine if the user is authorized to receive the portion of the first information.

24. The system of claim 16 wherein the note-taking device is configured to:
determine one or more requests stored in the notes document, the one or more requests including the first request;
communicate the first request to the server;

receive the portion of the first information from the server; and embed the portion of the first information in the first location in the notes document.

25. The system of claim 24 wherein the portion of the first information is a slide displayed during the first presentation.

26. The system of claim 24 wherein the portion of the first information is at least one of an audio segment recorded during the first presentation and a video segment recorded during the first presentation.

27. The system of claim 24 wherein the portion of the first information is at least one of an image displayed during the first presentation, and text information recorded during the first presentation.

28. The system of claim 16 wherein the note-taking device is configured to insert a visual marker in the first location in the notes document indicative of the first request.

29. The system of claim 16 wherein the note-taking device is configured to:
   allow the user of the note-taking device to configure a second request during the first presentation to insert a portion of a second information in a second location in the notes document, the second information comprising information captured during a second presentation;
   determine if the portion of the second information requested by the second request is accessible to the note-taking device; and
   store the second request in the notes document upon determining that the portion of the second information requested by the second request is not accessible to the note-taking device.

30. The system of claim 29 wherein the note-taking device is configured to:
   identify one or more requests stored in the notes document, the one or more requests including the first request and the second request;
   communicate the first request and the second request to the server;
   receiving the portion of the first information and the portion of the second information from the server;
   embed the portion of the first information in the first location in the notes document; and
   embed the portion of the second information in the second location in the notes document.

31. A computer-readable storage medium storing a computer program product executable by a processor for taking notes, the computer program product comprising:
   code for generating during a first presentation, at the note-taking device, a first request, wherein the first request identifies a portion of a first information captured during the first presentation to insert in a first location in the notes document, the first information comprising information captured by one or more capture devices while the first presentation is proceeding;
   code for determining if the note-taking device can communicate with a server configured to communicate one or more portions of the information captured by the one or more capture devices;
   code for storing the first request in the notes document upon determining that note-taking device cannot communicate with the server; and
   code for determining if note-taking device can communicate with the server, subsequent to storing the first request in the notes document; and
   code for communicating the first request from the note-taking device to the server upon determining that the note-taking device can communicate with the server;
   wherein the note-taking device is a computing device that enables a user to enter notes.

32. The computer-readable storage medium of claim 31 wherein the code for determining if the note-taking device can communicate with the server comprises:
   code for detecting a first signal after storing the first request in the notes document; and
   code for determining if the note-taking device can communicate with the server responsive to the first signal.

33. The computer-readable storage medium of claim 32 wherein the first signal is generated when the notes document is opened.

34. The computer-readable storage medium of claim 32 wherein the first signal is generated at a periodic interval.

35. The computer-readable storage medium of claim 32 wherein the first signal is generated in response to an action performed by a user of the note-taking device.

36. The computer-readable storage medium of claim 31 wherein the computer program product further comprises:
   code for communicating the first request from the note-taking device to the server;
   code for receiving, at the note-taking device, the portion of the first information from the server; and
   code for embedding the portion of the first information in the first location in the notes document.

37. The computer-readable storage medium of claim 36 wherein the computer program product further comprises:
   code for communicating, from the note-taking device to the server, information identifying a user of the note-taking device requesting the portion of the first information;
   code for determining, at the server, if the user is authorized to receive the portion of the first information; and
   code for communicating the portion of the first information from the server to the note-taking device if it is determined that the user is authorized to receive the portion of the first information.

38. The computer-readable storage medium of claim 32 wherein the computer program product further comprises:
   code for communicating, from the note-taking device to a server, information identifying a user of the note-taking device requesting the portion of the first information; and
   code for determining, at the server, if the user is authorized to receive the portion of the first information.

39. The computer-readable storage medium of claim 31 wherein the computer program product further comprises:
   code for determining one or more requests stored in the notes document, the one or more requests including the first request;
   code for communicating the first request from the note-taking device to a server;
   code for receiving, at the note-taking device from the server, the portion of the first information; and
   code for embedding the portion of the first information in the first location in the notes document.

40. The computer-readable storage medium of claim 39 wherein the portion of the first information is a slide displayed during the first presentation.

41. The computer-readable storage medium of claim 39 wherein the portion of the first information is at least one of an audio segment recorded during the first presentation and a video segment recorded during the first presentation.

42. The computer-readable storage medium of claim 39 wherein the portion of the first information is at least one of an image displayed during the first presentation, and text information recorded during the first presentation.

43. The computer-readable storage medium of claim 31 wherein the code for storing the first request in the notes document comprises:
- code for inserting a visual marker in the first location in the notes document indicative of the first request.

44. The computer-readable storage medium of claim 31 further comprising:
- code for generating, at the note-taking device during the first presentation, a second request to insert a portion of a second information in a second location in the notes document, the second information comprising information captured during a second presentation;
- code for determining if the portion of the second information requested by the second request is accessible to the note-taking device; and
- code for storing the second request in the notes document upon determining that the portion of the second information requested by the second request is not accessible to the note-taking device.

45. The computer-readable storage medium of claim 44 wherein the computer program product further comprises:
- code for identifying one or more requests stored in the notes document, the one or more requests including the first request and the second request;
- code for communicating the first request and the second request from the note-taking device to a server;
- code for receiving, at the note-taking device from the server, the portion of the first information and the portion of the second information;
- code for embedding the portion of the first information in the first location in the notes document; and
- code for embedding the portion of the second information in the second location in the notes document.

46. A device comprising:
- a processor; and
- a memory coupled to the processor, the memory storing a program that when executed by the processor causes the processor to:
  - execute a composing application that creates a notes document for storing notes;
  - configure a first request during a first presentation, wherein the first request identifies requested information from the first presentation to insert in a location in the notes document and the requested information from the first presentation is captured while the first presentation is proceeding;
  - determine if the processor can communicate with a server configured to communicate one or more portions of the information captured;
  - store the request in the notes document upon determining that the processor cannot communicate with the server;
  - determine if the processor can communicate with the server, subsequent to storing the request in the notes document; and
  - communicate the request from the notes document to the server upon determining that the processor can communicate with the server;
- wherein the program is configured to enable the user to enter notes.

\* \* \* \* \*